Patented May 21, 1946

2,400,515

UNITED STATES PATENT OFFICE 2,400,515

METHOD OF PURIFYING AND DEODORIZING CRUDE OIL

Floyd A. Kent and Clarence W. Patrick, Midland, Mich.

No Drawing. Application January 5, 1944, Serial No. 517,294

1 Claim. (Cl. 196—31)

This invention relates to a process for the treatment of crude oil, and more especially to the purification and deodorization thereof, and whereby the sludge, impurities, and other foreign matter is precipitated and then removed from the vessel or tank in which the oil is treated.

Some crude oil as it flows or is pumped from wells, has a very strong disagreeable odor, its color is either black, orange, or green; it is of a heavy consistency, and is disagreeable to handle and process, and we have therefore perfected a method of treatment which removes the sludge, impurities, and foreign matter, and consequently deodorizes and purifies the final product.

One of the prime objects of the invention is to provide a process which can be carried on in a very economical manner, and in which the various ingredients added are relatively inexpensive and easily obtainable.

A further object is to provide a process which is conducive to the purification of large volumes of oil; and which can be operated by unskilled labor with a minimum of mechanical equipment.

In our preferred method of treatment, we first take a predetermined volume of crude oil and heat it to approximately 110 degrees F., the temperature being dependent upon the type of oil and general climatic condition, after the oil is heated, the next step is to take a quantity of fine hydrated lime, mix it with water until it is of such consistency that it will readily flow, then add this lime to a predetermined volume of the heated oil, stirring or agitating thoroughly, after which we add a predetermined volume of muriatic or hydrochloric acid, stirring the mass as it works. The treated mass is then permitted to stand for a certain period of time after which it is placed in an oil purifier for agitation and the separation of sludge, impurities, and other foreign matter, all as shown and described in our companion application directed to "Crude oil purifiers," and filed Jan. 5, 1944, Serial No. 517,293, and which has issued as Patent No. 2,378,776, June 19, 1945.

The mixing of the product can be accomplished in any approved manner, and the proportions should be substantially as follows:

For treating one gallon of oil, we use one tablespoon of fine hydrated lime, mixing the lime with water until it readily flows, this lime mixture is then added to the oil, after which we add one ounce of muriatic or hydrochloric acid, agitating the mass thoroughly, and then letting it stand for a short period of time, after which it is placed in the crude oil purifier, and as the sludge, impurities, and other foreign matter are separated, they are removed from the machine, this eliminates the disagreeable odor, and the purified product will be of good color, and of relatively high specific gravity.

We find that the above treatment also eliminates all noxious fumes, especially mercaptan fumes which contain sulphur in place of oxygen, mercaptan being responsible for the disagreeable odor common to some crude oil, found in mineral formation or oil structure.

While in the present instance we have specifically referred to muriatic or hydrochloric acid, we do not wish to be limited thereto, as any acid having a chlorine base will effectively aid in the purification and deodorization of the final product.

From the foregoing description, it will be clearly obvious that we have perfected a very simple, practical and economical method for removing sludge, impurities, and foreign matter from crude oil.

What we claim is:

A method of treating crude oil which consists in first heating the oil to approximately 110 degrees F., then mixing a predetermined volume of hydrated lime and water so that it will readily flow, adding this mixture to the oil, adding a predetermined volume of chlorine acid to the mass, and then agitating the mass for a predetermined length of time.

FLOYD A. KENT.
CLARENCE W. PATRICK.